(12) United States Patent
Eckert et al.

(10) Patent No.: US 6,855,302 B2
(45) Date of Patent: Feb. 15, 2005

(54) METHOD FOR EMISSION CONTROL OF DIOXIN AND/OR FURAN WASTE GAS POLLUTANTS IN A CEMENT CLINKER PRODUCTION LINE

(75) Inventors: Carsten Eckert, Köln (DE); Andreas Hand, Köln (DE); Robert Mathai, Köln (DE)

(73) Assignee: KHD Humboldt Wedag AG, Cologne (DE)

( * ) Notice: Subject to any disclaimer, the term of this patent is extended or adjusted under 35 U.S.C. 154(b) by 286 days.

(21) Appl. No.: 10/293,837

(22) Filed: Nov. 13, 2002

(65) Prior Publication Data

US 2003/0105381 A1 Jun. 5, 2003

(30) Foreign Application Priority Data

Nov. 30, 2001 (DE) .......................................... 101 58 968

(51) Int. Cl.[7] .............................. B01J 8/00; C04B 2/10; C04B 7/45; F27B 7/02
(52) U.S. Cl. ................ 423/210; 423/210.5; 423/240 R; 106/745; 106/753; 432/106
(58) Field of Search ............................. 423/210, 210.5, 423/240 R; 432/106; 106/753, 745

(56) References Cited

U.S. PATENT DOCUMENTS 3,584,850 A * 6/1971 Brandvold et al. ......... 106/753
4,425,092 A * 1/1984 Brachthauser et al. ...... 432/106
5,614,016 A * 3/1997 Hundebøl .................... 106/745
6,142,771 A * 11/2000 Doumet ........................ 432/14

* cited by examiner

Primary Examiner—Stanley S. Silverman
Assistant Examiner—Jonas N. Strickland
(74) Attorney, Agent, or Firm—Sonnenschein Nath & Rosenthal LLP

(57) ABSTRACT

In order to provide a comparatively simple and cost-effective method for cement clinker production lines where especially raw materials and/or fuel/secondary fuel containing chlorine compounds and a partial gas extraction with an electrostatic dust collector as waste gas dust remover are used, with which the risk of emitting the waste gas pollutants dioxin and/or furan is eliminated, it is proposed in accordance with the invention that the extracted quantity of the partial gas extraction stream, after cooling and electrostatic dust removal, is held lower than the sum of the secondary air drawn through the rotary kiln and the tertiary air drawn past the rotary kiln, and to recirculate the cooled and dedusted partial gas extraction solely into an area of the clinker cooler in which the recuperation air is removed from the clinker cooler, and the dioxins and/or furans of the partial gas extraction are decomposed in the clinker cooler on the hot cement clinker and/or deposited and/or decomposed by the high temperature treatment in the burners of the rotary kiln and the precalcinator.

6 Claims, 1 Drawing Sheet

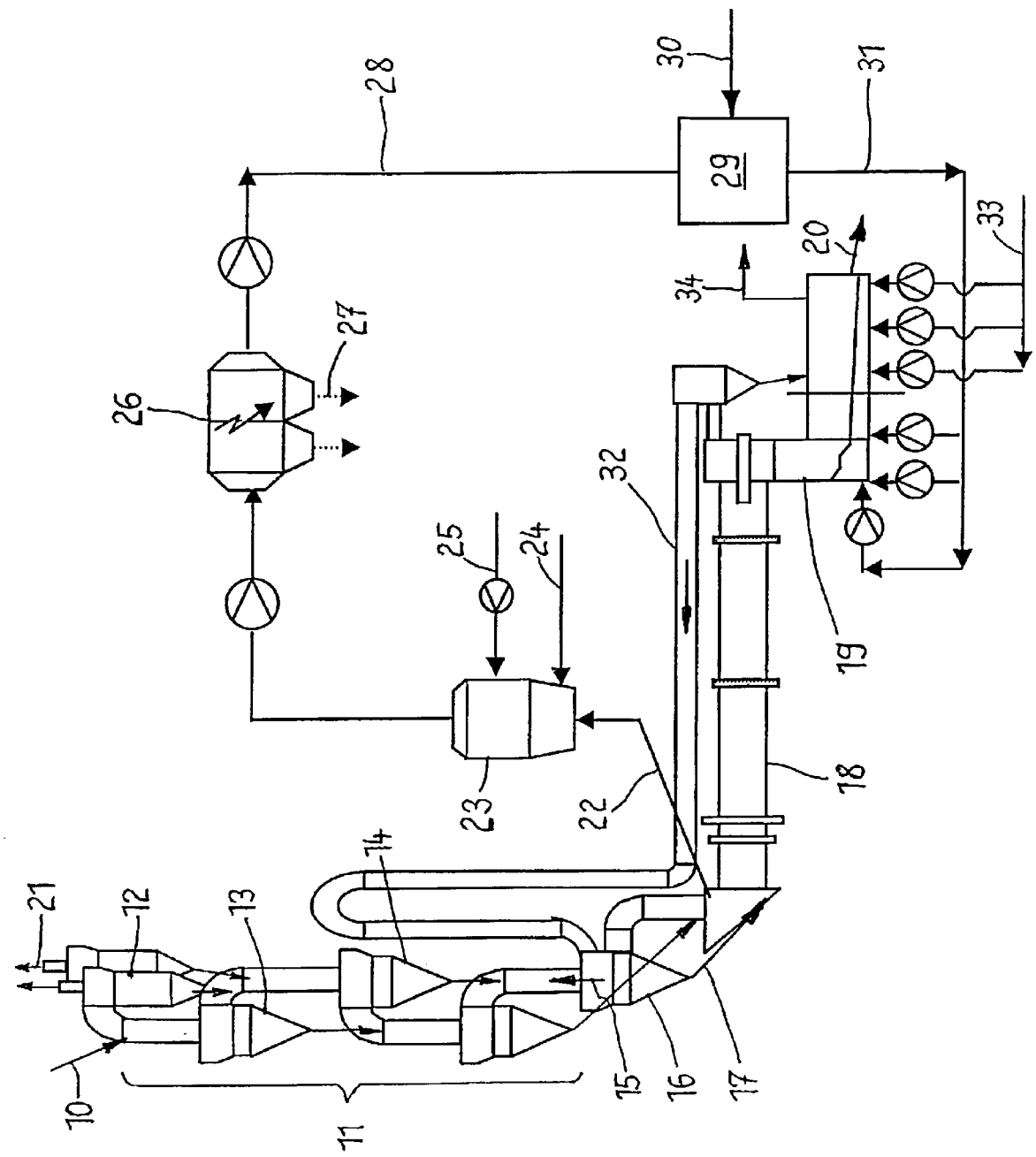

METHOD FOR EMISSION CONTROL OF DIOXIN AND/OR FURAN WASTE GAS POLLUTANTS IN A CEMENT CLINKER PRODUCTION LINE

BACKGROUND OF THE INVENTION

The invention relates to a method for reducing the emission of the waste gas pollutants dioxin and/or furan contained especially in a hot partial gas extraction with which a respective pollutant-containing partial stream from the rotary kiln waste gas of a system for manufacturing cement clinkers is extracted, cooled in a mixing chamber and dedusted in an electrostatic dust collector, and the cement clinker from the rotary kiln is cooled in a connected cooler and an exhaust air stream (tertiary air) of the clinker cooler is used separately or with the rotary kiln waste gas for precalcining the cement raw meal.

In the cement technology, it is known that many materials used for manufacturing cement clinker contain minor constituents, such as alkali compounds, sulfur, chlorine, heavy metals, etc. which partially evaporate in the area of the sintering zone, recondense in the preheater area and thus build up circuits which can negatively affect the quality of the cement clinker and interfere considerably with the combustion process itself. In order to prevent an alkali chloride circulation in a cement clinker combustion system, for example, and reduce the alkali chloride content in the cement clinker, it is known in the art to branch off and extract a part of the rotary kiln waste gas containing pollutants via a so-called partial gas extraction in the lower area of the waste gas ascension pipe between the rotary kiln and the cyclone suspension-type heat exchanger system, and at a temperature level at which the volatile pollutants are not yet condensed or only partially condensed. If the extracted partial gas stream is high in alkali chloride, the partial gas stream is cooled and then dedusted in its own electrostatic dust collector. If the alkali chlorides are not fully condensed, and if the partial gas extraction stream still contains unacceptable levels of gaseous/vaporous pollutants, the partial gas extraction would have to be discarded and purified in its own waste gas purification system (article entitled "Problems of electrostatic dust removal from waste gases high in alkali chloride of partial gas extractions in heat exchanger-type dry rotary kilns" in the trade magazine Zement-Kalk-Gips [cement-lime-gypsum] no. 5/1978, pages 236 to 238).

However, in addition to the formation of alkali chlorides, the formation of dioxins and/or furans increasingly represents a problem in manufacturing cement clinker. The formation of the waste gas pollutants dioxin and furan in the cement clinker manufacturing process is conceivable in three different ways:

Caused by raw materials. Because of the organically bound carbon and the chlorides existing in limestone it is possible for dioxin to develop in the upper stages of the cyclone suspension-type heat exchanger system of the raw meal preheater. When the formed dioxins are not particle-bound and therefore are not incorporated into the cement clinker, they are able to escape to the outside with the waste gas. The countermeasures are limited, because a certain degree of TOC (total organic carbon) is naturally present in the cement raw meal and therefore, it cannot be prevented.

Caused by combustion fuel. The formation of dioxin is not expected when chlorinated combustion fuel, that is, fuel containing chlorine compounds, such as secondary fuel or waste fuel, is burned in the burner of the rotary kiln because of the high combustion temperatures. However, the probability of dioxin formation increases when burning chlorinated fuel in secondary combustion, that is, in the precalcinator preceding the rotary kiln in relation to the flow of materials because there, the temperature level of the fuel combustion is lower, and frequently no more than approx. 850° C. The third possibility for forming dioxin is caused by special dust removal systems, especially for the bypass gases or partial gas extractions in cement clinker production lines, by means of electrostatic dust collectors (E-filters). Arc-overs may be caused in such E-filters because of the high electric voltage. It was found that the combination of the prevailing temperatures and the high chloride content support the formation of dioxin. Said source of dioxin formation could be bypassed in that fabric filters are preferably installed for dust removal in new or rebuilt cement clinker production lines. There are many cases, however, where the effectively operating electrostatic dust collectors should not be avoided.

In EP-B-0 534 225, it was proposed to cool and dedust a bypass gas or a respective partial gas extraction containing the pollutants $SO_2$ and $NO_x$ and then recirculate this gas in the clinker cooler and via the secondary air in the rotary kiln so as to bind the $SO_2$ in the raw meal preheater to the lime component of the cement raw meal and reduce the $NO_x$ in the De-$No_x$ reduction zone of the rotary kiln waste gas ascending pipe of the precalcinator. However, the publication does not address reducing the emission of the waste gas pollutants dioxin and/or furan, such as may occur under certain circumstances in cement clinker production lines.

SUMMARY OF THE INVENTION

The aim of the invention is to provide a comparatively simple and cost-effective method for cement clinker production lines where especially chlorinated raw materials and/or chlorinated fuel/secondary fuel and a partial gas extraction with an electrostatic dust collector as waste gas dust remover are used, with which the risk of emitting the waste gas pollutants dioxin and/or furan is eliminated.

The partial gas extraction stream of a cement clinker production line can contain unacceptable levels of the waste gas pollutants dioxin and/or furan, especially when raw materials and/or fuel containing chlorine compounds are used and the partial gas extraction is dedusted in an electrostatic dust collector (E-filter). To prevent such pollutant emissions, the partial gas extraction is not purified in a separate gas purification system. Instead, in accordance with the invention, the partial gas stream, after cooling and electrostatic dust removal, is extracted in quantities that are lower than the sum of the volume of secondary air drawn through the rotary kiln and the volume of tertiary air drawn past the rotary kiln. According to the invention, said cooled and dedusted quantity of the partial gas extraction is recirculated solely in the area of the clinker cooler in which the recuperation air is removed from the clinker cooler. The recirculated partial gas extraction stream initially acts as cooling gas in the recuperation zone of the clinker cooler, before it flows into the rotary kiln as secondary air and into the tertiary air line, if applicable, as tertiary air. According to the invention, the partial gas extraction is purified in such a way that the dioxins and/or furans are destroyed upon contact with the hot cement clinker and/or they are deposited so as to be adsorptive and/or decomposed by the high temperature treatment especially in the rotary kiln, so that such pollutants will not escape to the outside. The cooler section joining the recuperation zone of the clinker cooler is cooled in that fresh air is blown in so that the cooler exhaust air extracted from said cooler section is free of pollutants.

In addition to purifying the bypass waste gases of a cement clinker production line, the method of the invention is also suitable for purifying a foreign waste gas stream containing dioxins and/or furans whose volume is lower than the recuperation air volume of the respective clinker cooler, which is approx. 0.80 to 1.0 Nm³/kg clinker.

BRIEF DESCRIPTION OF THE DRAWING

The invention and its other features and advantages are described in more detail by means of the schematic exemplary embodiment shown in the drawing which schematically illustrates a cement clinker production system.

DETAILED DESCRIPTION OF THE PREFERRED EMBODIMENT

The drawing shows a schematic illustration of a system suitable for performing the method of the invention where cement clinker is produced from cement raw meal 10 which is loaded into the top of the preheating stage 11 where it passes successively through the cyclone suspension-type heat exchangers 12, 13, 14 in combined concurrent flow/counterflow to the hot waste gas 15 of a precalcination stage. It is separated from the hot waste gas 15 in the bottom cyclone 16 and enters the inlet chamber of the rotary kiln 18 as high-grade (95%, for example) calcined cement raw meal 17. In the sintering zone of the rotary kiln 18 it is calcined to cement clinker which is subsequently cooled in a clinker cooler 19, for example a grate cooler. The cooled cement clinker exits the cooler 19 at 20.

The waste gas cooled by the cement raw meal exits the preheating stage 11 of the system at 21. The dioxin and/or furan content in the waste gas stream 21 is below the detection limit. This can be different in the case of the partial gas extraction stream 22, with which approx. 10%, for example, of the rotary kiln waste gas is extracted from the inlet chamber of the rotary kiln 18 as a hot pollutant-containing partial gas stream, which can contain dioxins and/or furans, especially when raw materials and/or fuel containing chloride compounds are used. The partial gas extraction stream 22, which is 1200° C., for example, is first cooled to 300° C., for example, in a bypass mixing chamber 23 by spraying in water 24 and introducing fresh air 25, followed by dust removal in an electrostatic dust collector (E-filter) 26 which may favor the formation of dioxin. Both the dust 27 containing pollutants and the dedusted partial gas extraction stream 28 are extracted from the E-filter 26. The partial gas extraction stream 28 can be cooled from 300° C., for example, to 100° C., for example, in an additional mixing chamber 29 by adding more fresh air 30 so as to reduce the thermal stress of the front clinker cooler fans. In any case, the cooled mixed gas 31 containing the pollutants dioxin and/or furan is recirculated into the recuperation zone of the clinker cooler 19 in a quantity that is lower than the sum of the secondary air drawn through the rotary kiln 18 and the tertiary air drawn through the tertiary air line 32 past the rotary kiln.

This means that the cooled and dedusted partial gas extraction stream 31 is supplied to the fans of the recuperation zone (left area) of the clinker cooler 19, while the fans of the adjoining zone (right area) of the clinker cooler are supplied with fresh air 33 as cooling air for the clinker cooler. Exhaust air 34 from the cooler, which is free of pollutants but no longer useable in the cement clinker production line itself, is removed from the latter clinker cooler sector.

As an example, the ratio of the cooling gas for the clinker cooler 19 can be approximately 25% recirculated partial gas extraction 31, for example, and approximately 75% fresh air 33, for example.

In any case, the dioxins and/or furans of the recirculated partial gas extraction stream 31 decompose on the hot cement clinker of the clinker cooler 19 and/or they are deposited so as to be adsorptive and/or decomposed and rendered harmless by the subsequent high temperature treatment in the area of the burner of the rotary kiln 18 and, if applicable, also in the area of the burner of the precalcinator connected in series with the rotary kiln.

If cement clinker is produced with the method of the invention, such method ensures that the pollutants dioxin and/or furan are not emitted to the outside even if raw materials containing chloride compounds and/or secondary combustion fuel/waste fuel containing chloride compounds are used and even if an electrostatic dust collector characterized by a high degree of efficiency is used for purposes of dust removal from the bypass extraction stream. At the same time, the heat content of the bypass mixed gas 31 is utilized in the cement clinker production. As a result of the recirculated bypass mixed gas stream 31, the temperature of the secondary air and the tertiary air increases and causes a decrease in the fuel demand in the burners of the rotary kiln and the precalcinator.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A method for reducing an emission of waste gas pollutants dioxin and/or furan contained in a hot partial gas extraction stream during the production of cement clinker from raw meal, comprising the steps:

extracting a pollutant-containing partial stream of a rotary kiln waste gas of a system for producing cement clinker, cooling the partial stream in a mixing chamber, dedusting the partial stream in an electrostatic dust collector, cooling the cement clinker from a rotary kiln in a connected cooler, using an exhaust air stream of the clinker cooler as a tertiary air separately or with the rotary kiln waste gas stream as a secondary air for precalcining the cement raw meal, extracting the pollutant-containing partial stream in a quantity which, after cooling and electrostatic dust removal, is lower than a sum of the secondary air drawn through the rotary kiln and the tertiary air drawn past the rotary kiln, removing a recuperation air from a recuperation zone of the clinker cooler, recirculating the cooled and dedusted partial stream solely into the recuperation zone of the clinker cooler from which the recuperation air is removed, and one of decomposing the dioxins and/or furans in the clinker cooler on the cement clinker, depositing the dioxins and/or furans on the cement clinker in the rotary kiln and decomposing the dioxins and/or furans by a high temperature treatment in the rotary kiln.

2. The method as defined in claim 1, wherein the partial stream of gas is recirculated into a first section of the clinker cooler which is adjacent to a clinker ejection side of the rotary kiln, and whose exhaust air flows into at least one of the rotary kiln as secondary air and the precalcinator as tertiary air.

3. The method as defined in claim 1, wherein the recuperation zone is provided with intake fans and fresh air is added to the partial gas from the electrostatic dust collector in an additional mixing chamber and the mixed gas is fully distributed to all fans of the recuperation zone.

4. A method for reducing an emission of waste gas pollutants dioxin and/or furan contained in a hot partial gas extraction stream during the production of cement clinker from raw meal utilizing a rotary kiln, comprising the steps:

extracting a pollutant-containing partial stream of a rotary kiln waste gas, cooling the partial stream in a mixing chamber, dedusting the partial stream in an electrostatic dust collector, cooling the cement clinker from the rotary kiln in a connected cooler, using at least one of an exhaust air stream of the clinker cooler as a tertiary air and the rotary kiln waste gas stream as a secondary air for precalcining the cement raw meal, extracting the pollutant-containing partial stream in a quantity which, after cooling and electrostatic dust removal, is lower than a sum of the at least one of the secondary air drawn through the rotary kiln and the tertiary air drawn past the rotary kiln, removing a recuperation air from a recuperation zone of the clinker cooler, recirculating the cooled and dedusted partial stream solely into the recuperation zone of the clinker cooler, whereby the dioxins and/or furans are decomposed in the clinker cooler on the cement clinker, the dioxins and/or furans are deposited on the cement clinker in the rotary kiln or the dioxins and/or furans are decomposed by a high temperature treatment in the rotary kiln.

5. The method as defined in claim 4, wherein the partial stream of gas is recirculated into a first section of the clinker cooler which is adjacent to a clinker ejection side of the rotary kiln, and an exhaust air of the clinker cooler flows into at least one of the rotary kiln as secondary air and the precalcinator as tertiary air.

6. The method as defined in claim 4, wherein the recuperation zone is provided with intake fans and fresh air is added to the partial gas from the electrostatic dust collector in an additional mixing chamber and the mixed gas is fully distributed to all fans of the recuperation zone.

* * * * *